United States Patent
Nogueira-Nine et al.

(10) Patent No.: US 8,175,109 B2
(45) Date of Patent: May 8, 2012

(54) BEACONLESS COMMUNICATION SYSTEM

(75) Inventors: Juan Nogueira-Nine, Stuttgart (DE); Ralf Böhnke, Esslingen (DE)

(73) Assignee: Sony Deutschland GmbH, Cologne (DE)

( * ) Notice: Subject to any disclaimer, the term of this patent is extended or adjusted under 35 U.S.C. 154(b) by 1289 days.

(21) Appl. No.: 11/273,656

(22) Filed: Nov. 14, 2005

(65) Prior Publication Data

US 2006/0133408 A1  Jun. 22, 2006

(30) Foreign Application Priority Data

Nov. 15, 2004  (EP) .................................. 04027121

(51) Int. Cl.
*H04L 12/413* (2006.01)
(52) U.S. Cl. ....... 370/447; 370/461; 455/434; 455/13.4; 455/574; 455/127.5; 455/127.1; 455/522
(58) Field of Classification Search .................. 455/522, 455/434, 574, 13.4, 127.5, 127.1; 370/447, 370/461
See application file for complete search history.

(56) References Cited

U.S. PATENT DOCUMENTS

| | | | |
|---|---|---|---|
| 6,192,230 B1 * | 2/2001 | van Bokhorst et al. | 455/343.3 |
| 2004/0063426 A1 | 4/2004 | Hunkeler | |
| 2004/0141490 A1 | 7/2004 | Hong | |
| 2004/0165574 A1 | 8/2004 | Kakumaru et al. | |
| 2004/0184475 A1 | 9/2004 | Meier | |

OTHER PUBLICATIONS

Christine E. Jones et al.; "*A Survey of Energy Efficient Network Protocols for Wireless Networks*", Wireless Networks 7, 343-358, 2001.
Laura Marie Feeney et al.; "*Investigating the Energy Consumption of a Wireless Network Interface in an Ad Hoc Networking Environment*", Proceedings of IEEE INFOCOM, Anchorage, AK, 2001.
Chunlong Guo et al.; "*Low Power Distributed MAC for Ad Hoc Sensor Radio Networks*", Berkeley Wireless Research Center Department of EECS, University of California at Berkeley, 2001, pp. 2944-2948.

(Continued)

*Primary Examiner* — Patrick Edouard
*Assistant Examiner* — Shantell L Heiber
(74) *Attorney, Agent, or Firm* — Oblon, Spivak, McClelland, Maier & Neustadt, L.L.P.

(57) ABSTRACT

The present invention relates to an energy efficient mechanism for establishing and maintaining a communication between nodes (A ... F) in a wireless communication system. In particular, it relates to a distributed low power medium access control (MAC) mechanism for sharing the communication means in a wireless communication system. According to the present invention a destination node (A) listens to a communication channel periodically. For requesting services from the destination node (A), a wake-up signal (WU) is transmitted from a source node (B) to the destination node (A) via the communication channel, wherein the wake-up signal (WU) is formed by a preamble (WP) and an information for controlling the communication between nodes (A ... F). The WU signal duration and content is adapted depending on the system operation context to reduce either idle times, power consumption, latency or network blocking (collision avoidance).

48 Claims, 7 Drawing Sheets

OTHER PUBLICATIONS

Figure 1:
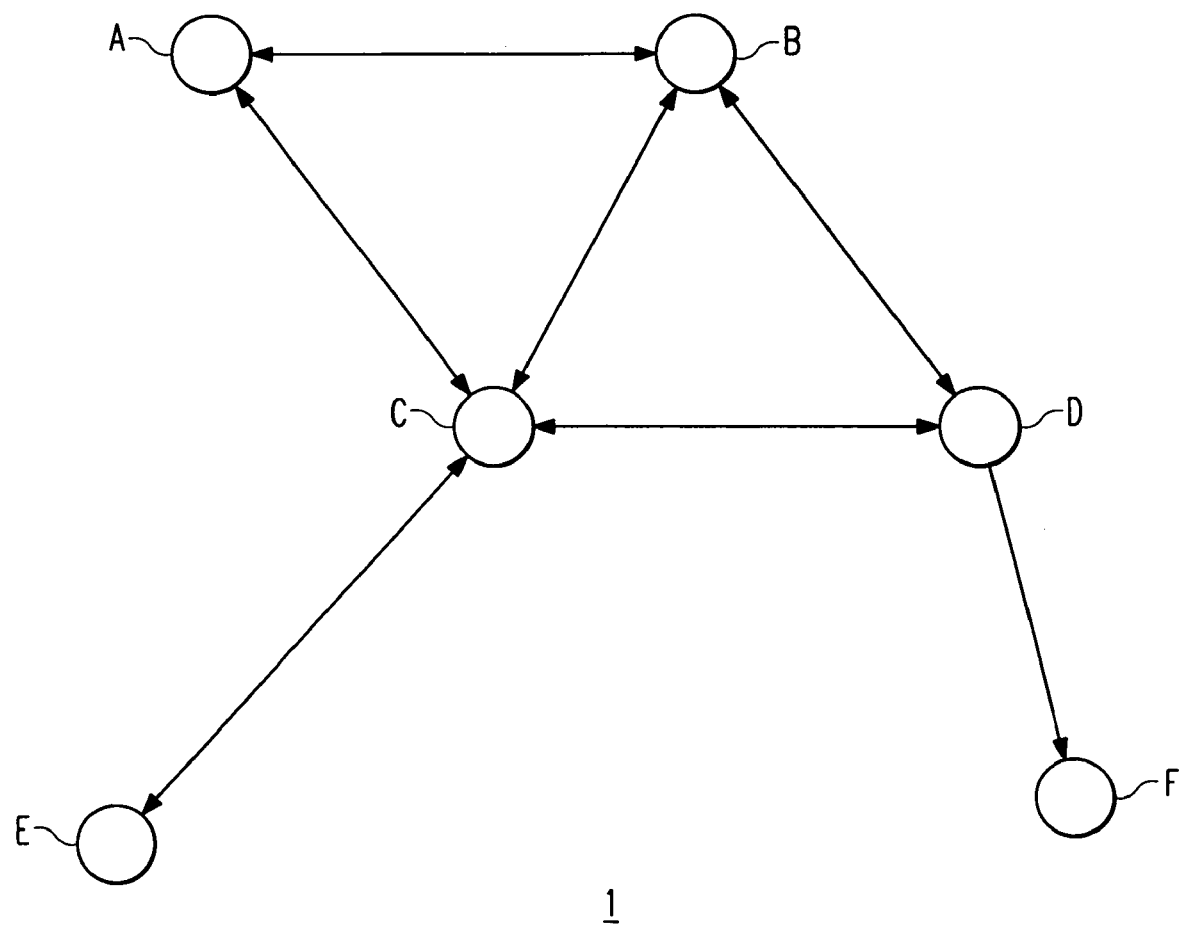

A. El-Hoiydi et al.; "*Low Power MAC Protocols for Infrastructure Wireless Sensor Networks*", CSEM, Swiss Center for Electronics and Microtechnology, Inc., Rue Jaquet-Droz 1, 2007, Neuchatel, Switzerland.

Mark Stemm et al.; "*Measuring and Reducing Energy Consumption of Network Interfaces in Hand-Held Devices*", Computer Science Division, Department of Electrical Engineering and Computer Science, University of California at Berkeley, Berkeley, CA 94720-1776, pp. 1-7.

Yurong Chen et al.; "*On Selection of Optimal Transmission Power for Ad hoc Networks*", Proceedings of the 36$^{th}$ Hawaii International Conference on System Sciences (HICSS 2003).

Jan M. Rabaey et al.; "*PicoRadio Supports Ad Hoc Ultra-Low Power Wireless Networking*", University of California, Berkeley, pp. 42-47, 2000.

Jean-Pierre Ebert et al.; "*Power Saving in Wireless LANs: Analyzing the RF Transmission Power and MAC Retransmission Trade-Off*", Telecommunication Networks Group, Technical University Berlin, in Proc. Of European Wireless '99 and ITG Fachtagung Mobile Komunikation, ITG Fachbericht 157, pp. 187-192, Oct. 1999, Munchen, Germany.

Yu-Chee Tseng et al.; "*Power-Saving Protocols for IEEE 802.11-Based Multi-Hop Ad Hoc Networks*," IEEE 2002.

\* cited by examiner

BEACONLESS COMMUNICATION SYSTEM

The present invention relates to an energy efficient mechanism for establishing a communication between nodes in a communication system. In particular, it relates to a distributed low power medium access control (MAC) mechanism for sharing the communication means in a wireless communication system.

In a wireless mesh/ad-hoc network each device (node) can communicate with any other device within its transmission range. If source and destination nodes of the network are not within the transmission range of each other, a message can be passed through one or more intermediate nodes until the message reaches the destination node. Thus, the coverage area of a mesh/ad-hoc network expands naturally as the number of nodes/users increases. Furthermore this type of networks is very resilient to operation failures happening in individual nodes, because the network is able to find another path for the messages avoiding the defect nodes.

The nature of the mesh/ad-hoc networks implies that the access to the radio resource has to be done in a distributed manner. A simple distributed access mechanism is the Carrier-Sense Multiple Access/Collision Avoidance (CSMA-CA) which is a radio access scheme where the occupancy of the carrier is measured and detected before utilisation of the medium to reduce the probability of collisions and subsequent data loss and/or need for data retransmission. This mechanism is a valid option and widely used in standard wireless Local Area Networks (LANs) like IEEE 802.11x, IEEE 802.15.3 or IEEE 802.15.4. However, due to the lack of a central controller which provides network timing synchronisation, the peer nodes in a mesh/ad-hoc network must find an alternative distributed solution to get each other time-synchronised and be able to exchange information because the destination node must be in reception mode when the source node is transmitting.

The easiest solution is that the destination nodes keep their receivers on (activated) all the time, which ensures that every transmission will be received if no collision occurs. Of course this solution is not applicable to small battery powered nodes (portable devices) due to power consumption reasons.

How to reduce the power consumed by the hardware radio in wireless devices has been an important research topic in the last few years. Several solutions have been proposed like adjusting the transmission power just to reach the destination node. Further, in Guo, C., et al., "Low Power Distributed MAC for Ad Hoc Sensor Radio Networks," IEEE GlobeCom 2001, November 2001, is suggested to use multi-hopping through intermediate nodes, or a specific hardware unit which allows waking-up a sleeping node remotely.

Nevertheless the most effective way to reduce the power consumed by the hardware radio (transceiver system) in a portable device of for example a low traffic network is to switch-off the radio whenever the radio is not being used for either data transmission or reception.

However, the problem to solve is how to synchronise the transmission and reception times. A power efficient solution is to switch on the receiver only at certain times, and use small data packets (beacons) which are transmitted periodically by every node, to inform other nodes in the neighbourhood about its listening schedule, i.e. when and for how long its receiver will be switched on. A beacon based MAC solution is proposed in IEEE 802.11 for ad-hoc operation in an Independent Basic Service Set (IBSS).

A beaconless solution for a low traffic network is described in El-Hoiydi, A., et al., "Low Power MAC Protocols for Infrastructure Wireless Sensor Networks", European Wireless 2004, Barcelona, 24-27 Feb. 2004. There is proposed a MAC protocol called "WiseMAC" by which the receivers are activated with the same constant period and listen to the radio channel for a very short period of time, just long enough to be able to receive one modulation symbol. In the WiseMAC protocol, instead of using beacons, the source node transmits, in front of every data, a wake-up preamble of a duration which is equal to the medium sampling period. All nodes which sense/sample the medium periodically and receive the wake-up signal continue to listen until a data packet is received. Further, for reducing the duration of the wake-up signal and for exact matching the listen time of a predetermined destination node, it is proposed that every node should learn the sampling schedule of all nodes. However, in the WiseMAC protocol, there is an energy waste since it is not always necessary to activate the receiver, if a wake-up signal is received by a node.

It is an object of the present invention to provide a communication method, a communication system, an apparatus for requesting services from a remote apparatus and an apparatus for providing services requested from a remote apparatus which reduce the power consumption in a communication system. This object is achieved by means of features of the enclosed independent claims. Advantageous features of the present invention are defined in the corresponding subclaims.

According to the present invention the destination node listens to a communication channel periodically, wherein the listen duration is $T_L$ and the listen periodicity is $T_{PL}$ and $T_L \ll T_{PL}$. For requesting services from the destination node, a wake-up signal is transmitted from a source node to the destination node via the communication channel, wherein the wake-up signal comprises a preamble and an information for controlling the communication between nodes. The duration of a signal block formed by the preamble and the control information is $T_{SB}$ and $T_{SB} < T_L$, preferably: $2T_{SB} < T_L$. Thus, with the present invention information like an address of a predetermined node or small commands which do not need additional data can be added to the wake-up signal. In this way the activation of the receiver can be controlled more exactly, i.e. whether and when the receiver has to be switched on. Further, the communication between nodes can be optimized and the power consumption reduced without additional data transmissions like beacons.

Preferably, the control information indicates a time point at which the source node starts a data transmission so that the destination node receiving the control information can switch off its receiver until the data transmission starts to save power.

Further, when the communication system comprises a plurality of nodes forming a network and the control information includes address information, a predetermined node can be addressed, wherein all nodes which receive the wake-up signal and are not addressed do not listen to the communication channel and/or transmit any data via the communication channel for a predetermined period of time. Thus, the power consumption is reduced and no collision occurs. The combination of addressing and time reference in the wake-up signal facilitates broadcast and multicast scenarios.

Advantageously, the control information indicates the duration of a subsequent data transmission. This information could be used as a Network Allocation Vector (NAV) by other nodes which detect when the medium is free, before starting the transmission of a wake-up signal.

For compensating drifts of the listen timing in the destination node and/or for connecting a plurality of destination nodes by a single wake-up signal, the wake-up signal comprises a repetition (i.e. a number of copies) of the signal block formed by the preamble and the control information, wherein listen duration $T_L$ is at least twice the duration of the signal block $T_{SB}$.

Further advantageously, in the control information, the command for selecting, on the receiving side, a predetermined communication channel can be included; a "Network joining" message can be used by a new node to indicate that it wants to join the network; or an "I'm alive" message can be used by a node which is already part of the network to inform other nodes within its transmission range that it is still alive or present, wherein this message may request or not an acknowledgement from the receiver node(s).

Preferably, to minimize the wake-up signal duration, the nodes interchange information of listen timing, and each node accumulates the timing information, wherein the source node calculates the start of the wake-up signal based on the timing information.

Further preferably, each node calculates clock drifts with respect to any other peer node based on the received timing information, wherein the source node calculates the start and/or the duration of the wake-up signal based on the drift. Thus every node learns about the real clock drift of its neighbour nodes, and also shares the accumulated timing information with other nodes to speed up the learning process for the new nodes joining the network.

It should be emphasised that the term "comprises/comprising" when used in this specification is taken to specify the presence of stated features, integers, steps or components but does not preclude the presence or addition of one or more other features, integers, steps, components or groups thereof.

Figure 2:
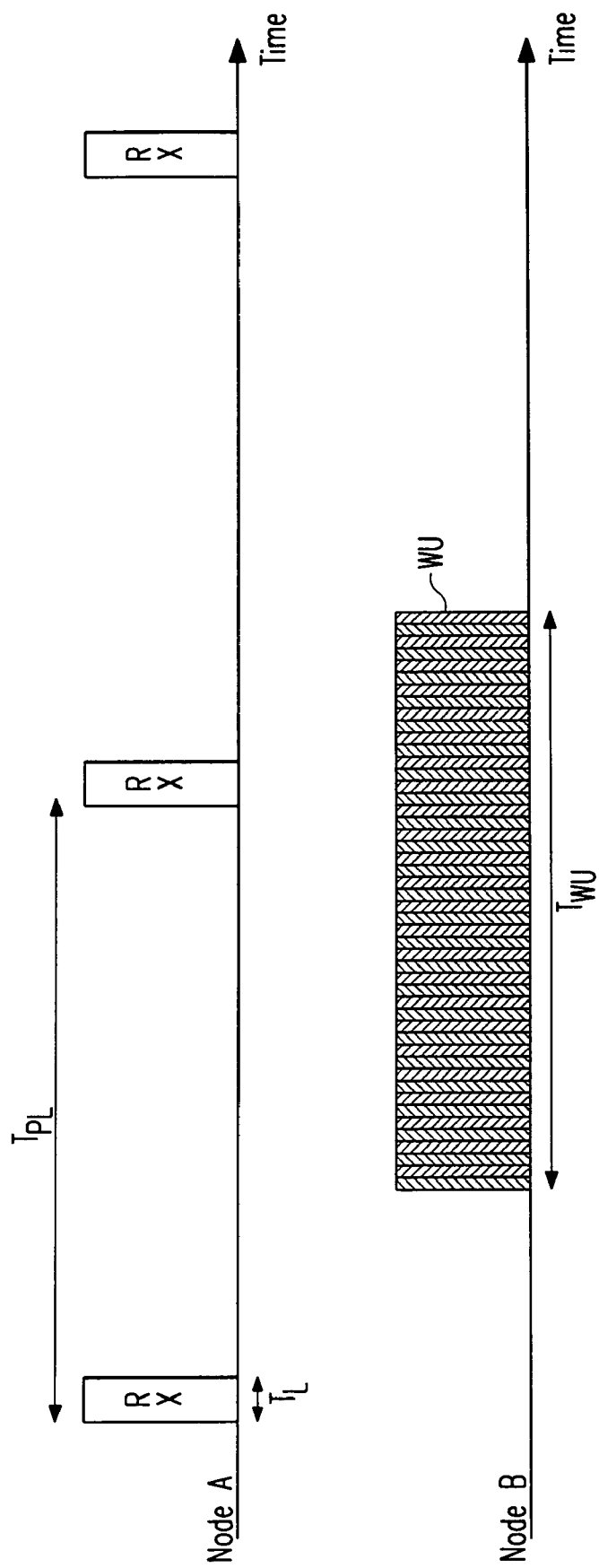
Figure 3:
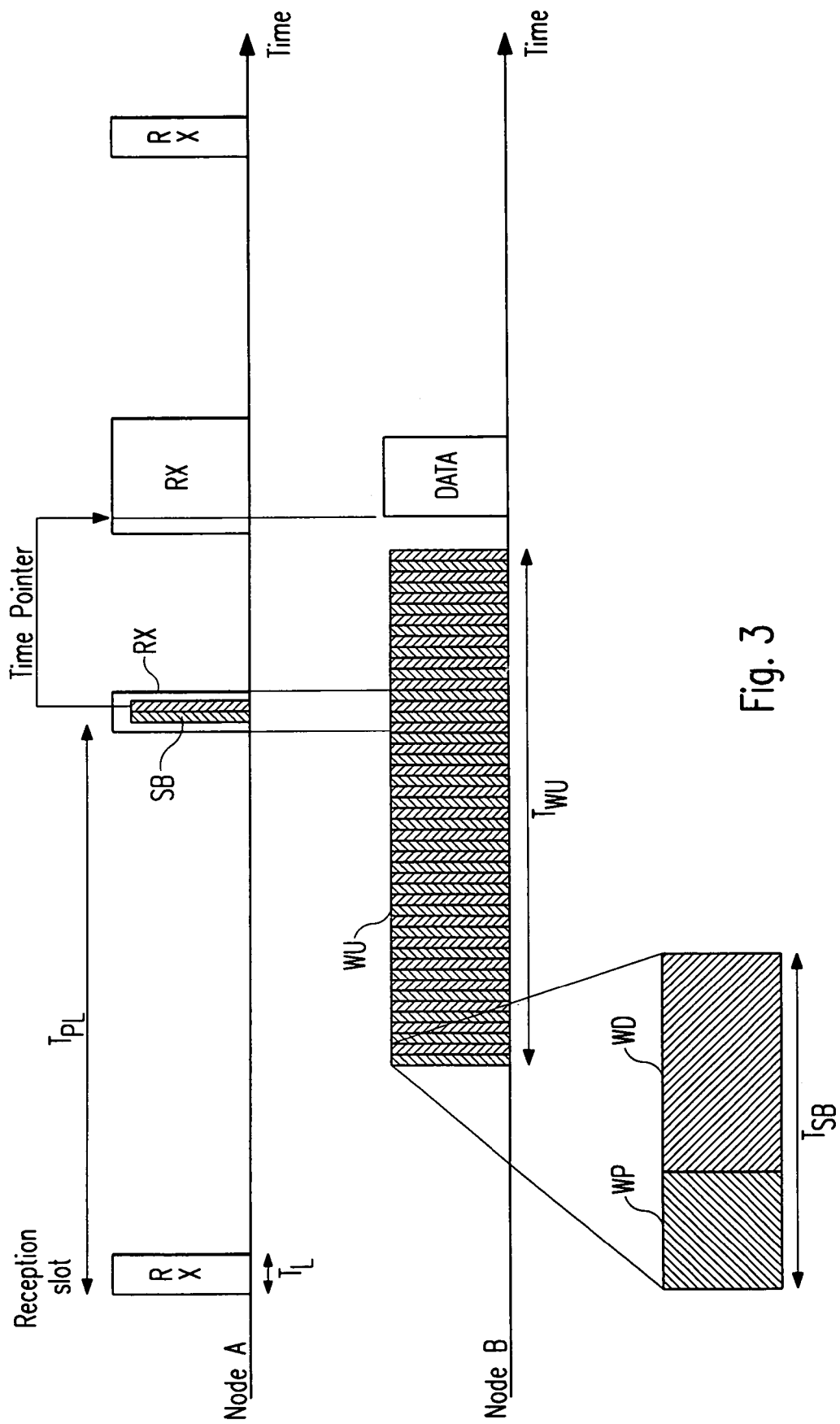
Figure 4:
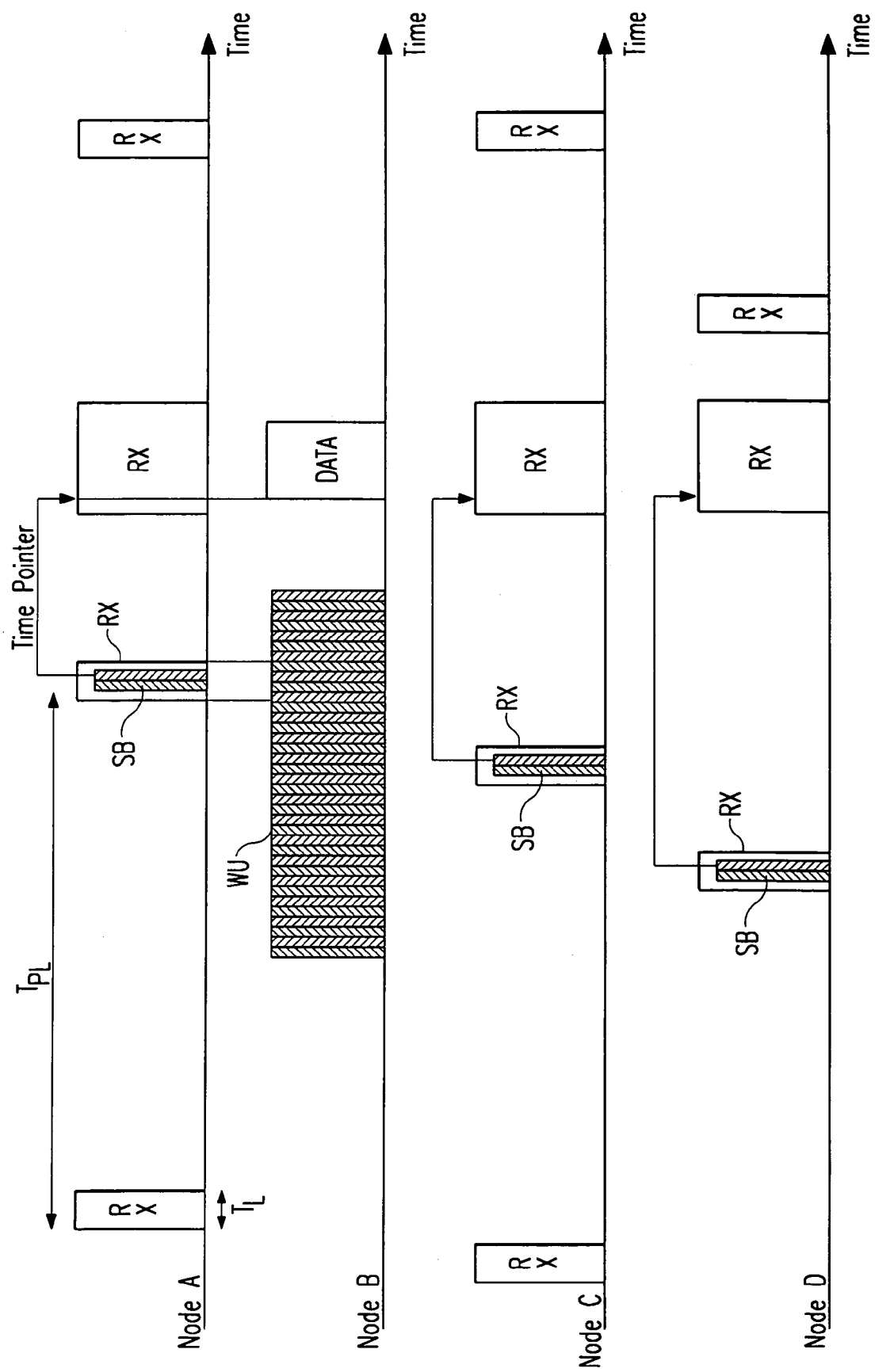
Figure 5:
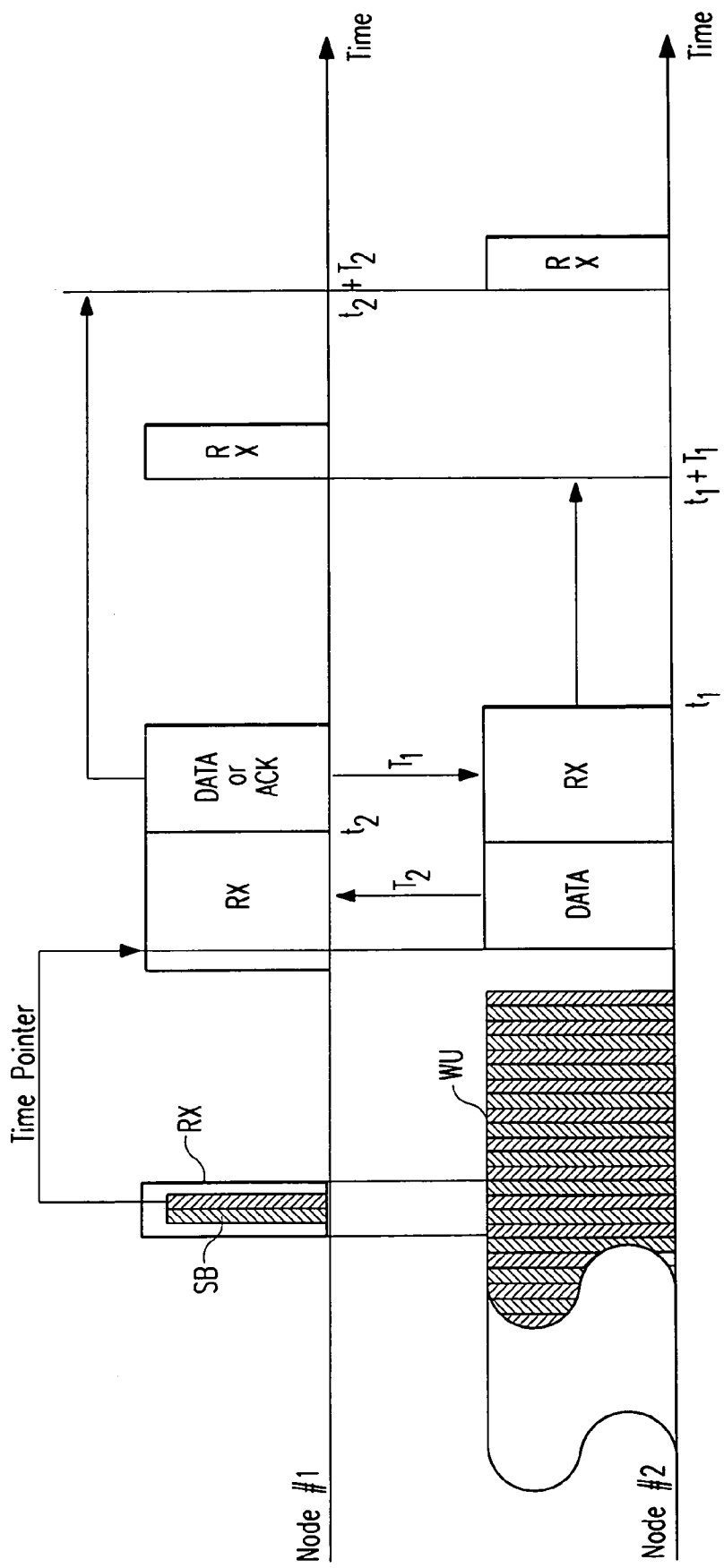
Figure 6:
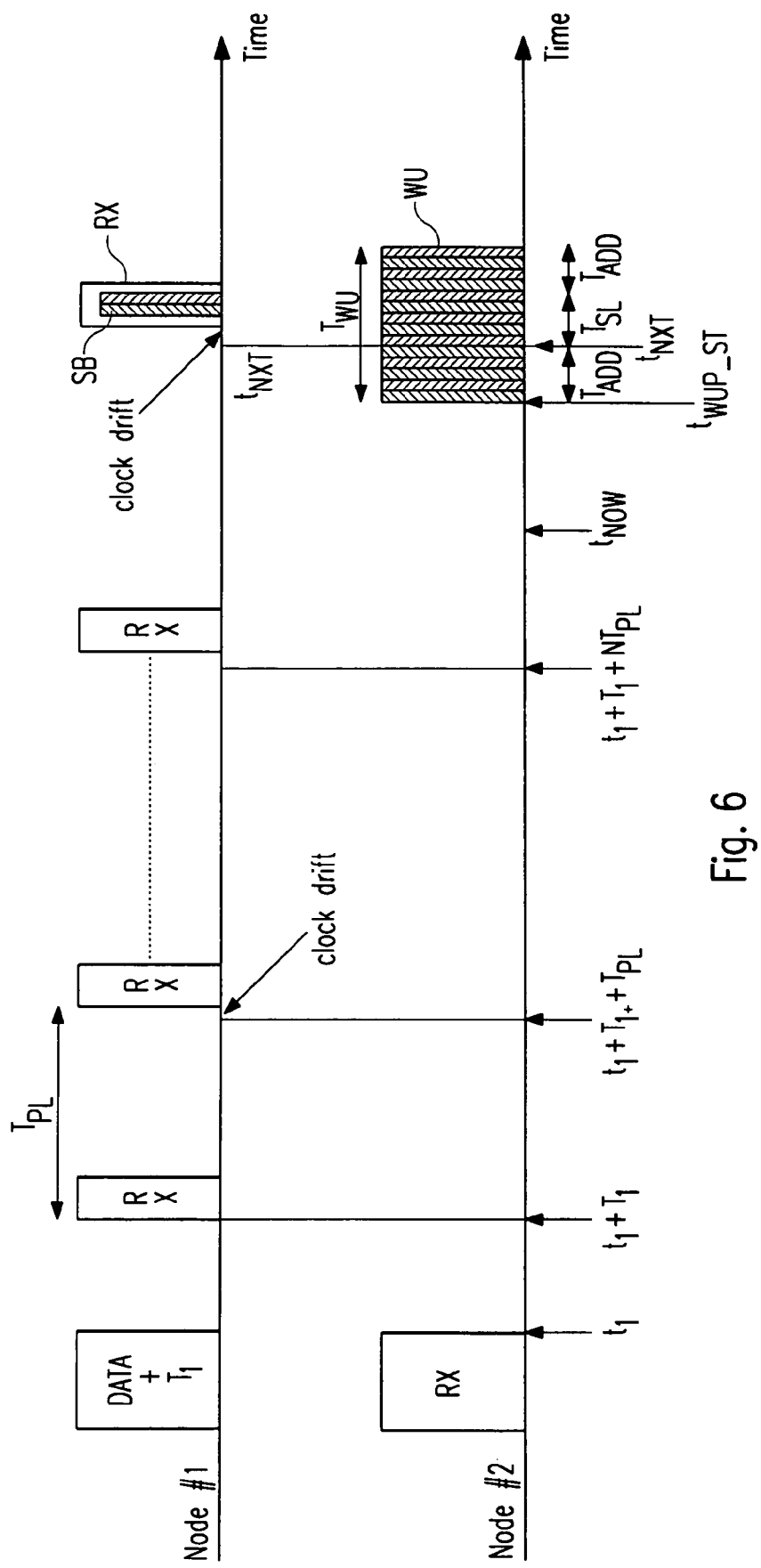
Figure 7:
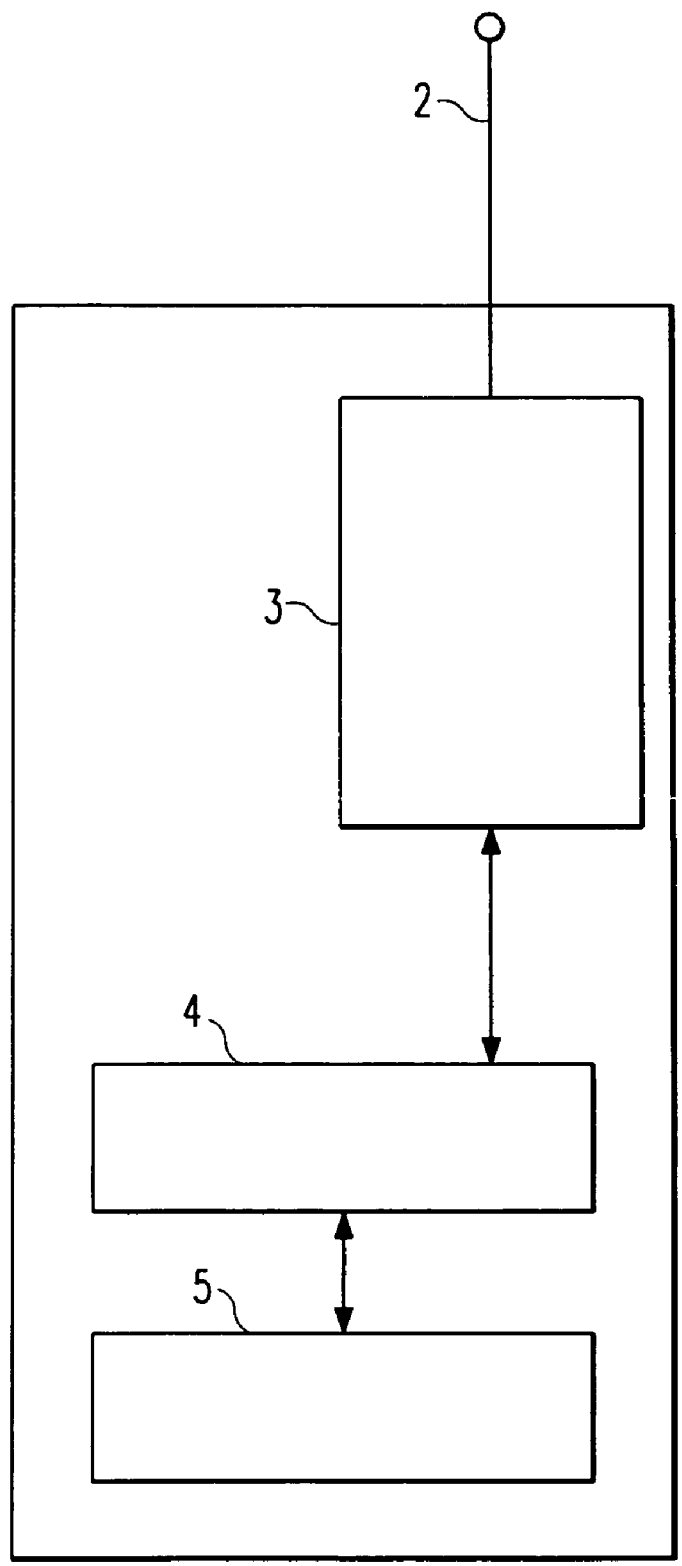

Embodiments of the invention will now be described, by way of example only, with reference to the accompanying drawings, in which:

FIG. 1 schematically shows a wireless communication network including a plurality of nodes employing an embodiment of the present invention, FIG. 2 shows a timing diagram illustrating an example of the wake-up mechanism with respect to one node according the present invention, FIG. 3 shows a timing diagram illustrating a further example of the wake-up mechanism with respect to one node according the present invention, FIG. 4 shows a timing diagram illustrating an example of the wake-up mechanism with respect to a plurality of nodes according the present invention, FIG. 5 shows a timing diagram illustrating an example of the wake-up mechanism and the interchange of data and listen timing information according the present invention, FIG. 6 illustrates, in a timing diagram, an example of the clock drift calculation according the present invention, and FIG. 7 shows a block diagram of an example of a wireless node shown in FIG. 1.

FIG. 1 schematically shows a wireless communication network 1 including a plurality of nodes A . . . F in which each node A . . . F can communicate with any other node A . . . F within its transmission range. The nodes A . . . F of the network 1 may be sensors, e.g. smoke detectors, fire alarm sensors, but also other kinds of devices such as actuators, personal digital assistants (PDA), mobile phones, etc.

According to the present invention, instead of periodically transmitting a beacon, the nodes A . . . F in the network 1 implementing the MAC protocol activate their receivers (not shown) and listen to the physical medium (air interface) for a very short period of time compared with the period of time in which the receivers are switched off. The listen periodicity $T_{PL}$ as well as the listen duration $T_L$, called reception slot are common to all the nodes A . . . F of the network 1, wherein $T_L \ll T_{PL}$. When a node detects the wake-up signal, the transmitter and receiver nodes can start the synchronisation phase to exchange data.

FIG. 2 shows a timing diagram illustrating an example of the wake-up mechanism in which the node B sends a wake-up signal WU to remotely activate the destination node A, wherein the node B wants to send data to the destination node A via a communication channel. As shown in FIG. 2, the reception slots RX of the node A have the duration $T_L$ and the period $T_{PL}$. The node B sends the wake-up signal WU having a duration $T_{WU}$ to inform the destination node A to keep its receiver activated for the subsequent data transmission following the wake-up signal WU. If the destination node A is within the transmission range of the source node B, and the wake-up signal duration $T_{WU}$ is long enough, i.e. $T_{WU} = T_{PL}$, one of reception slot TX of the destination node A will receive the wake-up signal WU.

As shown in FIG. 3, the wake-up signal WU preferably comprises a repetition of a signal block SB formed by a preamble WP and a small data packet WD. The preamble WP and the data packet WD are called "wake-up whistle" and "wake-up data" respectively. To ensure that at least one complete signal block SB can be received during any reception slot RX, the duration $T_{SB}$ of the signal block SB (whistle+data) must be less or equal than one half of the reception slot duration $T_{PL}$.

The node B transmitting the wake-up signal WU can embed different messages in the data packet WD, e.g. a command for selecting, on the receiving side, a predetermined communication channel, a "Network joining" message which indicates that the node B wants to join the network 1, or a "I'm alive" message which indicates that the node B is still alive or present in the network 1, wherein this message may request or not an acknowledgement from the receiver node A, and/or a "MAC data" message which indicates that the node B has user data to transmit, and that the transmission will start almost immediately after the wake-up signal. This is illustrated in FIG. 3, where a time pointer which indicates the data transmission starting point is inserted in the data packet WD. The time pointer is used by the node A to synchronise its receiver with the transmitter of node B.

Further, the destination node address can also be inserted in the wake-up data packet WD. If a physical address is available in the network 1 or the MAC address is not too long, the destination address can be a part of the wake-up data packet WD. The benefit would be that only the destination node A would activate its receiver at the time indicated by the time pointer. Any other node A . . . F catching the wake-up signal WU would not activate its receiver to decode the user data, which saves power in the nodes A . . . F not intended to receive this message. Broadcast or multicast addresses could also be used for sending information to multiple reception nodes A . . . F efficiently.

There are two important aspects regarding the time pointer. The first one is that the time pointer does not represent or indicate an absolute time value, but a relative one, as it is difficult to provide the same absolute time in the destination node(s). The time pointer indicates when the data transmission will start, but as a value which is measured from now on. This means that the time pointer of each wake-up data packet WD of the plurality of wake-up data packets WD in the wake-up signal WU must have a different value, which is calculated by the node B that is transmitting the wake-up signal WU. I.e., in the successive signal blocks SB of the wake-up signal WU, the length of the successive time pointers decreases.

The reason the time pointer indicates the actual instant every time is that the start of the wake-up signal could not be used because the receiver node A does not know when that wake-up signal WU started. On the other hand the end of the wake-up signal WU could be used as reference point for the time pointer, but this solution wastes power.

As the time pointer is not referred to the end of the wake-up signal, the receiving node A does not need to keep its receiver active during the rest of the wake-up signal WU. On the contrary, the node A just receives and decodes the wake-up data, and uses the embedded time pointer information to switch on the receiver at the right time. Obviously this reduces the time in which the receiver of the destination node A is activated, and hence more power is saved.

The benefit provided by the time pointer is even higher when a multicast or broadcast case is considered. In such a scenario only one wake-up signal WU has to be transmitted. The duration $T_{WU}$ of the wake-up signal WU will be the maximum value for a broadcast transmission, or a shorter value calculated to catch up a group of nodes A . . . F in a multicast case. In any case, as shown in FIG. 4, all implicated nodes A, C and D will switch on their receivers only when the data transmission starts. Thus, the nodes A, C and D do not need keep their receivers active to detect the end of the wake-up signal WU to use it as time reference point.

Together with the time pointer it is also possible to transmit information about the duration of the subsequent data transmission. This information could be used as a Network Allocation Vector (NAV) by other nodes A . . . F which detect when the medium is free, before starting the transmission of a wake-up signal WU.

In the embodiment described above, there is a clear drawback, which is the duration $T_{WU}$ of the wake-up signal WU. A long wake-up signal WU not only consumes power on the transmitting side but also occupies the radio channel for a substantial period of time, which prevents other nodes A . . . F to send other wake-up signals WU or may cause collisions with other ongoing transmissions (hidden node scenario).

According to a further embodiment of the present invention, for reducing the duration $T_{WU}$ of the wake-up signal WU, while still ensuring the catching of the reception slot RX of the destination node A, the nodes A . . . F in the network 1 keep a table where they store information about the local time when the last communication with other nodes A . . . F took place. During a communication between two nodes A . . . F every node A . . . F piggybacks, as part of its data or acknowledgement, the time T from now on, when its next reception RX slot will take place. Furthermore, each node which receives the time information T also stores, in the same table, the local time t when the last bit of the last packet was received.

The Table 1 shows an example of a timing table stored in an internal memory of a node #2 having a plurality of peer nodes #1, #3 . . . #n.

TABLE 1

| Node | last communication time | time to the next reception slot |
|---|---|---|
| Node #1 | $t_1$ | $T_1$ |
| Node #3 | $t_3$ | $T_3$ |
| ... | ... | ... |
| Node #n | $t_n$ | $T_n$ |

FIG. 5 shows a timing diagram illustrating an example of the wake-up mechanism and the interchange of data and the listen timing information with respect to the node #1 and node #2. As shown in FIG. 5, the node #2 transmits the time $T_2$ along the data, wherein the node #1 detects the time $t_2$ and records the timing information $t_2$, $T_2$ of the node #2. On the other hand the node #1 transmits the time $T_1$ along the data or acknowledgement, wherein the node #2 detects the time $t_1$ and records the timing information $t_1$, $T_1$ of the node #1.

When the node #2 wants to establish a communication with the node #1, the node #2 reads the timing information $t_1$, $T_1$ of the node #1 from the table and calculates the time $t_{NXT}$ of the next reception slot RX of the node #1 based on the timing information $t_1$, $T_1$. The time $t_{NXT}$ of the next reception slot RX of the node #1 is calculated by:

$$t_{NXT} = t_1 + T_1 + (N+1)T_{PL} \quad (1)$$

wherein N is the number of listening periods $T_{PL}$ (receiving slots) since $t_1$ and $T_{PL}$ is the listen periodicity, which is common to all the nodes #1 . . . #n. The number N of the listening periods $T_{PL}$ is calculated by:

$$N = E\left[\frac{t_{NOW} - t_1 - T_1}{T_{PL}}\right] \quad (2)$$

wherein E is the entire part operator.

As shown in FIG. 6, due to the clock drifts between the system clocks of the nodes #1 and #2, the starting time $t_{NXT}$ calculated by equation (1) differs from the real starting time of the next reception slot RX of the node #1. Thus, if the wake-up signal WU of the node #2 shall be matched exactly to the reception slot RX of the node #1, the clock drifts must be taken in to account when calculating the starting time $t_{NXT}$ and the duration of the wake-up signal $T_{WU}$.

The clock drift between the system clocks of the nodes #1 . . . #n of a network 1 is typically specified in parts per million (ppm). For example, a clock with a drift of 5 ppm may show a maximum deviation from the exact value of +5 μs or −5 μs every second. Therefore the absolute clock drifts in both nodes #1 and #2 are proportional to the elapsed time since they had the last communication, which is indicated by the time $t_1$.

The maximum clock drift time $T_{ADD}$ occurred in each of the nodes #1 and #2 since the last communication is calculated by:

$$T_{ADD} = \theta(t_{NXT} - t_1) = \theta(T_1 + (N+1)T_{PL}) \quad (3)$$

wherein θ is the clock drift. However, the node #2 should start the transmission of the wake-up signal WU two times the maximum clock drift $T_{ADD}$ before the calculated $t_{NXT}$. The reason for this is the worst case scenario in which one clock of the nodes #1, #2 could be advanced while the other delayed the same amount. The calculated starting point $t_{WU\_ST}$ for the wake-up signal in node #2 is therefore:

$$t_{WUP\_ST} = t_{NXT} - 2T_{ADD} = t_{NXT} - 2\theta(T_1 + (N+1)T_{PL}) = t_1 + (1-2\theta)(T_1 + (N+1)T_{PL}) \quad (4)$$

The drift clock time $T_{ADD}$ has to be taken into account also for the calculation of the wake-up signal duration $T_{WU}$. If the clock in node #2 is advanced to $T_{ADD}$ and the clock in node #1 is delayed by the same amount, and node #2 starts the transmission of the wake-up signal WU two times $T_{ADD}$ before $t_{NXT}$, it could happen that the wake-up signal WU starts $4T_{ADD}$ before the reception slot RX really starts in node #1. Considering this, the duration $T_{WUP}$ of the wake-up signal WU should be:

$$T_{WUP} = T_{SL} + 4\theta(T_1 + (N+1)T_{PL})$$

$$T_{WUP} = T_{SL} + T_{ADD} = T_{SL} + 4\theta(T_1 + (N+1)T_{PL}) \quad (5)$$

As the maximum duration of signal is the listening period $T_{SL}$, the equation (5) is modified to:

$$T_{WUP}=\min\{T_{PL}, T_{SL}+4\theta(T_1+(N+1)T_{PL})\} \qquad (6)$$

Thus, by calculating $t_{WUP\_ST}$ and $T_{WUP}$, the duration of the wake-up signal can be reduced and hence the power consumption. For example, if the listening time $T_{PL}$ is 1 s, the clock drift is 50 ppm, the reception slot time $T_{SL}$ is 10 ms and the last communication between two nodes occurred 1 minute ago, the wake-up signal length calculated based on equation (6) is only 22 ms, instead of 1 s.

Additionally, to reduce the duration $T_{WU}$ of the wake-up signal WU, every node #1 . . . #n calculates the real clock drift with any other peer node within its transmission range. This can be done by comparing the values of both local and remote clocks every time a communication happens. The clock values can be piggybacked with the data or acknowledgements.

In each node, the clock drifts estimated with respect to each peer node #1 . . . #n are stored in a timing table in an internal memory. The Table 2 shows an example of the timing table of node #2.

Furthermore, every node #1 . . . #n can share its table with all other nodes so that a new node joining the network does not need to learn everything about listening schedules and clock drift values from all other nodes, but use the already collected information stored in the tables of those nodes.

TABLE 2

| Node | Last Communication time | Time to the next reception slot | Average drift |
| --- | --- | --- | --- |
| Node #1 | $t_1$ | $T_1$ | $q_1$ |
| Node #3 | $t_3$ | $T_3$ | $q_3$ |
| ... | ... | ... | ... |
| Node #n | $t_n$ | $T_n$ | $q_n$ |

FIG. 7 shows a block diagram of a wireless node A . . . F shown in FIG. 1. As shown in FIG. 7, the node A . . . F comprises a transceiver 3 which is coupled to an antenna 2 and is capable of receiving and transmitting signals to and from the peer nodes, a controller 4 which controls the transceiver 3 and calculates the timing information and a memory 5 which stores the table 2.

Although the preferred field of the invention relates to small battery powered nodes (devices) of a wireless communication network, the present invention can be applied also to non-battery powered devices of stationary communication networks advantageously.

The invention claimed is:

1. A beaconless communication method between nodes in a communication system, said communication system comprising at least two nodes, the method comprising:
    listening to a communication channel by a destination node periodically during reception slots using a receiver of the destination node, wherein a listen duration is $T_L$ and a listen periodicity is $T_{PL}$ and $T_L \ll T_{PL}$; and
    transmitting a wake-up signal before a payload data transmission from a source node to said destination node via said communication channel using a transmitter of the source node, wherein
    said wake-up signal contains a preamble and a control information,
    a duration of a signal block formed by said preamble and said control information is $T_{SB}$ and $2 \cdot T_{SB} < T_L$,
    in said communication system, the communication between said nodes is controlled based on said control information,
    said control information indicates a subsequent time point at which said source node starts the payload data transmission and said destination node receiving said control information starts the listening to the communication channel,
    the transmitter of the source node does not transmit signals between a last bit of the payload data transmission and a next wake-up signal subsequent to the last bit of the payload data transmission, and
    the receiver of the destination node does not listen to the communication channel between a reception slot and the subsequent time point, the subsequent time point indicated in the control information of the wake-up signal received by the destination node during the reception slot and the subsequent time point identifying a time at which the destination node starts the listening to the communication channel for reception of the payload data transmission.

2. The communication method according to claim 1, wherein said communication system is a wireless communication system.

3. The communication method according to claim 1, wherein the listen periodicity is $T_{PL}$ and $2 \cdot T_L \ll T_{PL}$.

4. The communication method according to claim 1, wherein said communication system comprises a plurality of nodes forming a network and said control information indicates that said source node wants to join said network.

5. The communication method according to claim 1, wherein said communication system comprises a plurality of nodes-forming a network and said control information indicates that said source node is still present in said network.

6. The communication method according to claim 1, wherein said communication system comprises a plurality of nodes forming a network and said control information indicates an address of a predetermined node.

7. The communication method according to claim 6, wherein, when said nodes receive said wake-up signal via said communication channel and are not addressed by said control information, said nodes do not listen to said communication channel and/or transmit any data via said communication channel for a predetermined period of time.

8. The communication method according to claim 7, wherein said control information indicates the duration of a subsequent payload data transmission and said predetermined period of time is the duration of said subsequent payload data transmission time indicated by said control information.

9. The communication method according to claim 1, wherein said control information indicates a period between a time point at which the control information is transmitted and said time point at which said source node starts the payload data transmission.

10. The communication method according to claim 9, wherein said wake-up signal comprises a repetition of said signal block, wherein, for each of the successive signal blocks, the period between the time point at which the control information is transmitted and said time point at which said source node starts the payload data transmission is calculated.

11. The communication method according to claim 1, wherein said control information indicates a selection of a predetermined communication channel.

12. The communication method according to claim 1, wherein said communication system comprises a plurality of nodes and said nodes interchange timing information of listen timing and each node accumulates said timing information wherein said source node calculates a start of said wake-up signal based on said timing information.

13. The communication method according to claim 12, wherein each node calculates a clock drift with respect to any other peer node based on said timing information, wherein said source node calculates the start and/or a duration of said wake-up signal based on said clock drift.

14. A beaconless communication system constituted by at least two nodes, the system comprising:
- means for listening, on a destination node, to a communication channel periodically during reception slots, wherein a listen duration is $T_L$ and a listen periodicity is $T_{PL}$ and $T_L (\ll T_{PL}$; and
- means for transmitting a wake-up signal before a payload data transmission from a source node to said destination node via said communication channel, said wake-up signal containing a preamble and a control information, wherein
- a duration of a signal block formed by said preamble and said control information is $T_{SB}$, and $2 \cdot T_{SB} < T_L$,
- in said communication system, the communication between said nodes is controlled based on said control information,
- said destination node is configured to detect whether said control information indicates a subsequent time point at which said source node starts the payload data transmission and to listen to a communication channel at said time point,
- the transmitter of the source node does not transmit signals between a last bit of the payload data transmission and a next wake-up signal subsequent to the last bit of the payload data transmission, and
- the means for listening of the destination node does not listen to the communication channel between a reception slot and the subsequent time point, the subsequent time point indicated in the control information of the wake-up signal received by the destination node during the reception slot and the subsequent time point identifying a time at which the destination node starts the listening to the communication channel for reception of the payload data transmission.

15. The communication system according to claim 14, wherein said communication system is a wireless communication system.

16. The communication system according to claim 14, wherein the listen periodicity is $T_{PL}$ and $2 \cdot T_L \ll T_{PL}$.

17. The communication system according to claim 14, wherein said communication system comprises a plurality of nodes forming a network and said destination node is adapted to detect whether said control information indicates that said source node wants to join said network.

18. The communication system according to claim 14, wherein said communication system comprises a plurality of nodes forming a network and said destination node is adapted to detect whether said control information indicates that said source node is still present in said network.

19. The communication system according to claim 14, wherein said communication system comprises a plurality of nodes forming a network and said destination node is adapted to detect whether said control information indicates an address of a predetermined node.

20. The communication system according to claim 19, wherein said destination node is adapted to stop the listening to said communication channel and/or the transmission of any data via said communication channel for a predetermined period of time when said destination node is not addressed by said control information.

21. The communication system according to claim 20, wherein said destination node is adapted to detect whether said control information indicates the duration of a subsequent payload data transmission and said predetermined period of time is the duration of said subsequent payload data transmission time indicated by said control information.

22. The communication system according to claim 14, wherein said control information indicates a period between a time point at which the control information is transmitted and said time point at which said source node starts the payload data transmission.

23. The communication system according to claim 22, wherein said source node is adapted to generate a wake-up signal comprising a repetition of said signal block, wherein said source node comprises means for calculating, for each of the successive signal blocks in said wake-up signal, the period between the time point at which the control information is transmitted and the time point at which said source node starts the payload data transmission.

24. The communication system according to claim 14, wherein said destination node is adapted to detect whether said control information indicates a predetermined communication channel.

25. The communication system according to claim 14, further comprising a plurality of nodes, wherein said nodes are configured to interchange timing information of listen timing and each node is configured to accumulate said timing information, wherein said source node is configured to calculate a start of said wake-up signal based on said timing information.

26. The communication system according to claim 25, wherein each node is configured to calculate a clock drift with respect to any other peer node based on said timing information, wherein said source node is configured to calculate the start and/or a duration of said wake-up signal based on said clock drift.

27. Apparatus for requesting services from a remote apparatus, said remote apparatus listens to a communication channel periodically during reception slots, wherein a listen duration is $T_L$ and a listen periodicity is $T_{PL}$ and $T_L \ll T_{PL}$, the requesting apparatus comprising:
- wake-up signal generating means for generating a wake-up signal;
- control means for controlling said wake-up signal generating means to generate said wake-up signal when a service is requested from said remote apparatus; and
- transmitting means for transmitting the wake-up signal generated by said wake-up signal generating means to said remote apparatus via said communication channel, said wake-up signal containing a preamble and a control information, wherein
- a duration of a signal block formed by said preamble and said control information is $T_{SB}$ and $2 \cdot T_{SB} < T_L$,
- said wake-up signal generating means adds control information indicating a subsequent time point at which the transmitting means starts a payload data transmission to said wake-up signal,
- the transmitting means does not transmit signals between a last bit of the payload data transmission and a next wake-up signal subsequent to the last bit of the payload data transmission, and
- the remote apparatus does not listen to the communication channel between a reception slot and the subsequent time point, the subsequent time point indicated in the control information of the wake-up signal received by the remote apparatus during the reception slot and the subsequent time point identifying a time at which the remote apparatus starts listening to the communication channel for reception of the payload data transmission.

28. The apparatus according to claim 27, wherein the listen periodicity is $T_{PL}$ and $2 \cdot T_L \ll T_{PL}$.

29. The apparatus according to claim 27, wherein said wake-up signal generating means adds a control information including a network join request to said wake-up signal.

30. The apparatus according to claim 27, wherein said wake-up signal generating means adds a control information including a presence notice to said wake-up signal.

31. The apparatus according to claim 27, wherein said wake-up signal generating means adds a control information indicating the address of a remote apparatus from which a service has to be requested to said wake-up signal.

32. The apparatus according to claim 27, wherein said wake-up signal generating means adds a control information indicating a duration of a subsequent payload data transmission to said wake-up signal.

33. The apparatus according to claim 27, wherein said control information indicates a period between a time point at which the control information is transmitted and said time point at which said transmitting means starts the payload data transmission.

34. The apparatus according to claim 33, wherein said wake-up signal generating means generates a wake-up signal comprising a repetition of said signal block, wherein said wake-up signal generating means comprises means for calculating, for each of the successive signal blocks in said wake-up signal, a period between the time point at which the control information is transmitted by said transmitting means and the time point at which said transmitting means starts the payload data transmission.

35. The apparatus according to claim 27, wherein said wake-up signal generating means adds a control information indicating a predetermined communication channel to said wake-up signal.

36. The apparatus according to claim 27, further comprising means for receiving timing information of listen timing from a remote apparatus, wherein said control means calculates a start of said wake-up signal based on said timing information.

37. The apparatus according to claim 36, wherein said control means calculates a clock drift with respect to said remote apparatus based on said timing information and, wherein said control means calculates the start and/or a duration of said wake-up signal based on said clock drift.

38. Apparatus for providing services requested from a remote apparatus, the apparatus comprising:
receiving means for receiving a wake-up signal sent from said remote apparatus via a communication channel;
control means for controlling said receiving means to listen to said communication channel periodically during reception slots, wherein a listen duration is $T_L$ and a listen periodicity is $T_{PL}$ and $T_L \ll T_{PL}$, said control means providing a service when said wake-up signal is received by said receiving means, said wake-up signal contains a preamble and a control information, and a duration of a signal block formed by said preamble and said control information is $T_{SB}$ and $2 \cdot T_{SB} < T_L$; and
a separating means for separating said control information from said wake-up signal, wherein
said control means controls said receiving means based on said control data separated by said separating means,
said control means detects whether said control information indicates a subsequent time point at which said remote apparatus starts a payload data transmission and controls said receiving means to listen to a communication channel at said subsequent time point,
said receiving means does not receive a signal from said remote apparatus between a last bit of the payload data transmission and a next wake-up subsequent to the last bit of the payload data transmission, and
said receiving means does not listen to the communication channel between a reception slot and the subsequent time point, the subsequent time point indicated in the control information of the wake-up signal received from said remote apparatus during the reception slot and the subsequent time point identifying a time at which said receiving means starts the listening to the communication channel for reception of the payload data transmission.

39. The apparatus according to claim 38, wherein the listen periodicity is $T_{PL}$ and $2 \cdot T_L \ll T_{PL}$.

40. The apparatus according to claim 38, wherein said control means detects whether said control information includes a network join request.

41. The apparatus according to claim 38, wherein said control means detects whether said control information includes a presence notice.

42. The apparatus according to claim 38, wherein said control means detects whether said control information includes an apparatus address.

43. The apparatus according to claim 42, wherein said control means controls said receiving means to stop the listening to said communication channel and/or the transmission of any data via said communication channel for a predetermined period of time when said service providing apparatus is not addressed by said control information.

44. The apparatus according to claim 43, wherein said control means detects whether said control information indicates the duration of a subsequent payload data transmission of said remote apparatus, and wherein said predetermined period of time is a duration of said subsequent payload data transmission time indicated by said control information.

45. The apparatus according to claim 38, wherein said control information indicates a period between a time point at which the control information is transmitted and said time point at which said transmitting means starts the payload data transmission.

46. The apparatus according to claim 38, wherein said control means detects whether said control information indicates a selection of a predetermined communication channel.

47. The apparatus according to claim 38, wherein said control means detects timing information of listen timing of a remote apparatus received by said receiving means, wherein said control means calculates a start of said wake-up signal based on said timing information.

48. The apparatus according to claim 47, wherein said control means calculates a clock drift with respect to said remote apparatus based on said timing information, and wherein said control means calculates the start and/or a duration of said wake-up signal based on said clock drift.

* * * * *